R. E. HELLMUND.
MEANS FOR CONTROLLING FLASHING IN HIGH VOLTAGE COMMUTATOR MACHINES.
APPLICATION FILED JUNE 8, 1917.

1,367,140.     Patented Feb. 1, 1921.

WITNESSES:
William Siler
D. C. Davis

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

MEANS FOR CONTROLLING FLASHING IN HIGH-VOLTAGE COMMUTATOR-MACHINES.

1,367,140. Specification of Letters Patent. Patented Feb. 1, 1921.

Application filed June 8, 1917. Serial No. 173,509.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Means for Controlling Flashing in High-Voltage Commutator-Machines, of which the following is a specification.

My invention relates to methods of and apparatus for minimizing flashing in high-voltage dynamo-electric machines of the commutator type, and it has for its object to provide a system of the character designated that shall be simple and effective in operation.

Figure 1:
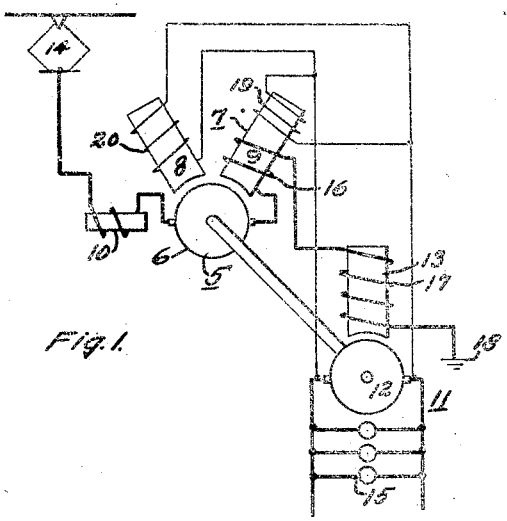
Figure 2:
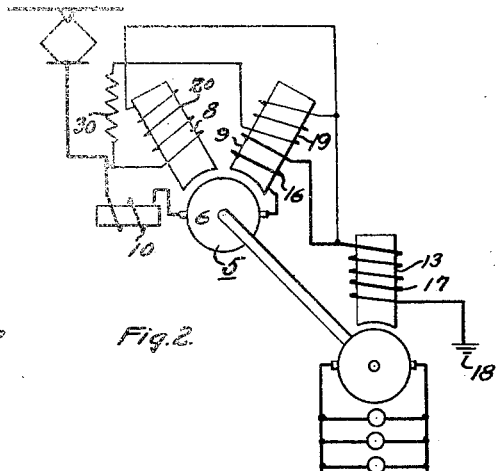
Figure 3:
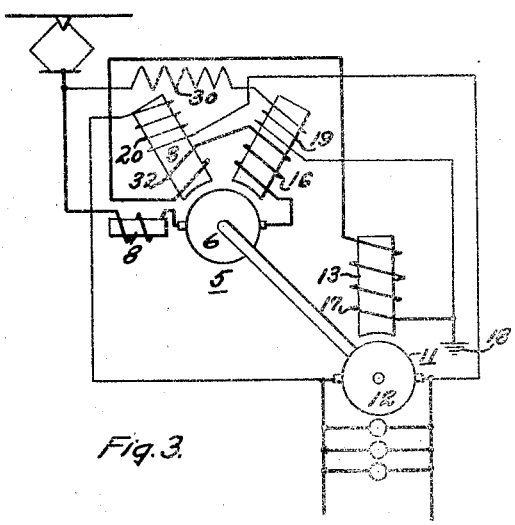
Figure 4:
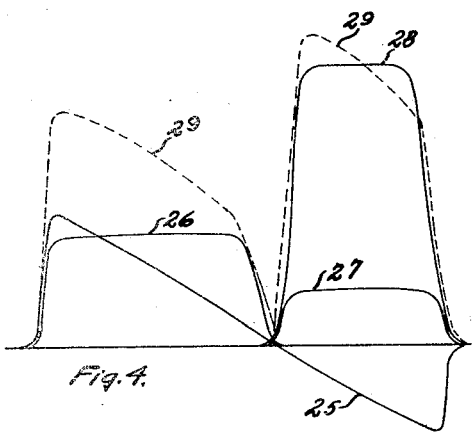

In the accompanying drawing, Figure 1 is a diagrammatic view of a dynamo-electric machine embodying my invention, shown in connection with a high-voltage motor-generator set; Figs. 2 and 3 are diagrammatic views of modifications of the system shown in Fig. 1; and Fig. 4 is a diagram illustrating the field form in a machine embodying my invention.

In the operation of dynamo-electric machines of the high-voltage, commutator type, particularly those that are subject to intermittent loads, such, for example, as the driving motors of motor-generator sets employed in energizing the auxiliary circuits of a railway vehicle operating on a high-voltage, direct-current trolley, extreme difficulty has been encountered because of flashovers at the commutator. If the motors of sets of the character designated are of the shunt or compound-wound type, excessive field distortion and consequent flashing takes place upon establishing the power circuit after a power interruption. If, on the other hand, the motors of such sets are of the series-wound type, flashing is liable to occur when a set is started from rest, on account of the too sudden increase of the main field flux. These phenomena are described in detail in an article by me entitled "Commutation and flashing in railway motors," appearing on page 298 *et seq.* of the "*Electric Journal*" for July, 1915.

Field distortion in a motor increases magnetization of the following pole horn, in contrast with field distortion in a generator which increases the magnetization of the leading pole horn. Thus, in a motor, the effect of field distortion is to produce a stiffening of the field under the toe of the brush, producing electromotive forces in the short circuited armature coils undergoing commutation in such manner as to produce sparking under the toe of the brush. In accordance with the present invention, I provide means whereby, if there is a tendency to undue field distortion because of rapidly changing load conditions and consequent readjustments in the magnetic equilibrium in the motor, magnetic forces are temporarily developed to produce field distortion in the direction of rotation, rather than in the opposite direction, thus holding the field strength at the brush tips substantially uniform in value, and largely mitigating the ill effects of said load changes upon the commutation. I produce this effect by the use of split pole pieces, the two halves of each pole piece being circumferentially displaced from each other and being provided with magnetizing means having different characteristics, as will be hereinafter more fully pointed out.

Referring to Fig. 1 of the drawing for a more detailed understanding of my invention, I show the motor of a motor-generator set at 5 in Fig. 1, said machine comprising an armature 6, a main pole 7, comprising two portions 8 and 9, and a commutating or interpole 10. The generator of the motor-generator set is shown at 11 and comprises an armature 12 and an exciting field pole 13. Energy for the operation of the motor-generator set is taken from a high-voltage direct-current trolley 14, and the low-voltage auxiliary circuits supplied thereby are indicated at 15. The field poles 9 and 13 are provided with series-type field windings 16 and 17, respectively, and said field windings are connected in series with the armature 6 and the winding of the interpole 10 between the trolley 14 and ground, indicated at 18. The field pole 9 is further provided with a shunt-type field winding 19, and the field pole 8 with a shunt-type field winding 20. The field winding 20 comprises more turns than the field winding 19 and said two field windings are connected, respectively, to the terminals of the generator 11.

Having thus described the arrangement of the system of Fig. 1, the operation thereof is as follows. Assuming a sudden increase in the load upon the motor 5, necessitating an increase in the load current therethrough, there is an increase in the armature magnetomotive force. Any tendency of said armature magnetomotive force to vary the flux traversing the pole portions 8 and 9 is opposed by the reaction of the shunt-type field windings 19 and 20, and the opposing or damping effect of the field winding 20 is greater than that of the field winding 19 because of the greater number of turns contained therein. The sudden increase of the total main field flux is retarded by the choking effect of the windings 19 and 20, operating in parallel with each other and having their circuit closed through the armature winding. The increase of the cross-field flux produces an electromotive force in one direction through the winding 20 and in the opposite direction through the winding 19 so that these two windings operate in series with each other to exert the damping effect upon the cross-field flux, together producing a closed circuit. The balancing current traversing all portions of this local closed circuit is the same, and, as there are more turns in the winding 20 than in the winding 19, the magnetomotive force retards the building up of the cross-field flux in the pole piece 8 more than in the pole piece 9. Thus, the tendency to an abnormal strengthening of the field under the pole piece 8 is largely reduced, but, nevertheless, a compound operating characteristic is imparted to the motor 5 by reason of the operation of the series field winding 16. The shunt windings 20 and 19 are connected across the terminals of a generator 11, as the relatively low voltage thereof permits the use of a relatively small number of turns of coarse wire.

For an understanding of the operation of the system thus described, attention is directed to Fig. 4 wherein the curve 25 represents the distribution of the magnetomotive force of armature reaction across the pole face. The curve 26 represents the magnetomotive force produced by the shunt winding 20, and the curve 27 the magnetomotive force produced by the shunt field winding 19. The field produced by the series winding 16 is represented by the curve 28, and the resultant magnetomotive force by the curve 29. It will be noted that the portion of the curve 29 produced by the joint action of the windings 16 and 19 is higher than that portion produced by the winding 20 and it will further be noted that the effect of the series winding 16 on a rapidly increasing current will be to still further increase the preponderance of the windings 16 and 19 over the winding 20. Thus, the field distortion, upon a sudden increase of current, will be away from the toe of the brush rather than toward said zone and, consequently, the liability to sparking and flash-overs will be radically diminished.

Under certain conditions, it may be desirable to still further reduce the damping effect of the shunt field winding 19 so that, on sudden load increments, the flux may be built up much more rapidly through the pole piece 9 than through the pole piece 8. To this end, I may employ the system shown in Fig. 2, a resistor 30 being connected in series with the winding 19 to reduce the circulating currents and, therefore, the damping effect thereof. The shunt field windings in Fig. 2 are shown connected across the terminals of the high-voltage motor rather than across those of the relatively low-voltage generator, although this construction necessitates the use of windings having a large number of turns of relatively fine wire.

In the system of Fig. 3, a small series winding 32 is placed on the pole piece 8 in addition to the shunt winding 20 but the joint magnetization of the windings 16 and 19 is still such as to produce a marked preponderance of the magnetomotive force in the pole 9 over that in the pole 8. The damping effect of the shunt field winding 19 is still minimized by the use of the resistor 30. By this means, the field winding 19 may well be connected in shunt to the motor 5, whereas the shunt field winding 20, which does not have the protection of a resistor, is shown connected in shunt relation to the generator 11.

In all the foregoing circuits, the exciting field winding of the generator has been shown connected in series with the driving motor, as this arrangement introduces a certain amount of self-induction in the motor circuit, the winding 16 not being able to exert a pronounced inductive action because of the damping effect of the winding 19. By the inclusion of an inductive element in the motor circuit, abrupt current changes therein are prevented, still further minimizing the tendency to poor commutation and to flash-overs.

While I have shown my invention in a plurality of forms, it will be obvious to those skilled in the art that it is susceptible of various minor changes and modifications without departing from the spirit thereof and I desire, therefore, that only such limitations shall be placed thereupon as are imposed by the prior art or are specifically set forth in the appended claims.

I claim as my invention:

1. In a motor of the commutating type, a two-part exciting pole piece, said parts being circumferentially displaced from each other, a shunt-connected field winding on the following pole portion and both shunt and series-connected field windings on the remaining pole portion, said shunt field windings being connected in parallel relation to each other.

2. In combination, a low-impedance source of unidirectional current and a motor of the commutating type comprising a two-part exciting pole piece, said parts being circumferentially displaced from each other, a shunt-connected field winding on the following pole portion and both shunt and series-connected windings on the remaining pole portion, said shunt windings being connected in parallel relation across said low-impedance source of unidirectional current.

3. In a motor of the commutating type, a two-part exciting pole piece, said parts being disposed in side-by-side relation and circumferentially displaced from each other, a shunt-connected field winding on the following pole portion and an additional shunt-type field winding on the remaining pole portion, said shunt field windings being connected in parallel relation to each other.

4. In combination, a low-impedance source of unidirectional current and a motor of the commutating type comprising a two-part exciting pole piece, said parts being disposed in side-by-side relation and circumferentially displaced from each other, a shunt-connected field winding on the following pole portion and an additional shunt-type field winding on the remaining pole portion, said shunt windings being connected in parallel relation across said low-impedance source of unidirectional current.

5. In a motor of the commutating type, a two-part exciting pole piece, said parts being circumferentially displaced from each other, a shunt-connected field winding on the following pole portion and both shunt and series connected field windings on the remaining pole portion, said shunt field windings being connected in parallel relation to each other and the shunt winding on the following pole portion embodying more effective turns than that on the leading pole portion.

6. In a motor of the commutating type, a two-part exciting pole piece, said parts being circumferentially displaced from each other, a shunt-connected field winding on the following pole portion and an additional shunt type field winding on the remaining pole portion, said shunt-field windings being connected in parallel relation to each other and the shunt winding on the following pole portion embodying more effective turns than that on the leading pole portion.

In testimony whereof, I have hereunto subscribed my name this 26th day of May 1917.

RUDOLF E. HELLMUND.